US006876124B1

United States Patent
Lin et al.

(12) United States Patent
Lin et al.

(10) Patent No.: US 6,876,124 B1
(45) Date of Patent: Apr. 5, 2005

(54) METHOD AND SYSTEM FOR SECURING AND CONTROLLING AN ELECTRO-STATICALLY DRIVEN MICRO-MIRROR

(75) Inventors: Andrew T. H. Lin, Dallas, TX (US); Edward W-Y Shih, Plano, TX (US); Richard Yeh, Monterey Park, CA (US)

(73) Assignee: Tera FiberOptics, Fremont, CA (US)

( * ) Notice: Subject to any disclaimer, the term of this patent is extended or adjusted under 35 U.S.C. 154(b) by 210 days.

(21) Appl. No.: 10/006,066

(22) Filed: Dec. 6, 2001

(51) Int. Cl.[7] .......................... H02N 1/00; G02B 26/08; B02B 26/10
(52) U.S. Cl. ..................... 310/309; 359/223; 359/291
(58) Field of Search .................. 319/309; 359/223, 359/224, 290, 291, 298; 73/504.12; 257/415; 386/18

(56) References Cited

U.S. PATENT DOCUMENTS

| | | | | |
|---|---|---|---|---|
| 5,629,794 A | * | 5/1997 | Magel et al. | 359/290 |
| 5,739,941 A | * | 4/1998 | Knipe et al. | 359/224 |
| 5,894,090 A | * | 4/1999 | Tang et al. | 73/504.02 |
| 6,128,122 A | * | 10/2000 | Drake et al. | 359/224 |
| 6,504,643 B1 | * | 1/2003 | Peeters et al. | 359/290 |

\* cited by examiner

*Primary Examiner*—Karl Imayoshi Tamai

(57) ABSTRACT

An electrically actuated micro-mirror system is disclosed. The system has at least three supporting springs attached to a micro-mirror providing at least two rotational degrees of freedom thereof. At least two optional enhancement springs are fanned out from an associated supporting spring to secure the micro-mirror, and the micro-mirror is electro-statically actuated to rotate while the supporting springs and the enhancement springs operate primarily in a tensile mode.

20 Claims, 11 Drawing Sheets

METHOD AND SYSTEM FOR SECURING AND CONTROLLING AN ELECTRO-STATICALLY DRIVEN MICRO-MIRROR

BACKGROUND OF THE INVENTION

The present invention relates generally to micro-electro-mechanical devices, and more particularly, to a system and method for securing and controlling an electrostatically driven micro-mirror.

In fiber-optic switches, a micro-mirror is used which has a very reflective top surface that reflects an incoming electromagnetic radiation to a desired direction. The micro-mirror is usually supported by a set of springs to maintain the position of the micro-mirror. For example, FIG. 1 illustrates an example of a conventional method for securing a micro-mirror 10. The micro-mirror 10 is secured by two linear springs 12, and can rotate along an axis formed along the two springs. Other variations of the micro-mirror are also known in the industry.

Unfortunately, these prior art methods for securing and controlling the micro-mirror tend to be unstable under electrostatic actuation due to a so-called "Avalanche" effect wherein the electro-static force dominantly takes over other restoring forces. Moreover, another drawback for most of these methods and systems is that they allow the micro-mirror to rotate along only one pre-determined axis, thereby greatly limiting the directions that one micro-mirror can reflect the electromagnetic radiation into. This limitation leads to the necessary inclusion of multiple micro-mirrors in a fiber-optic switch in order to reflect the radiation in multiple directions, thus adding significant cost to the fiber-optic switch manufacturers.

Another limitation of the conventional method is that the micro-mirror tends to have a so-called "stiction" problem wherein the micro-mirror is "stuck" to a surrounding surface undesirably and is unable to restore back to its previous position(s). In FIG. 1, the dotted line 14 shows the position of the micro-mirror in a "stuck" position wherein the micro-mirror is basically "bonded" to the surface 15 underneath (or above) the micro-mirror. As such, the micro-mirror becomes irreversibly dysfunctional, and the entire package of one or more micro-mirrors in the switch will have to be replaced.

What is needed is an efficient method and system for securing and more flexibly controlling a micro-mirror in the fiber-optic switch to reflect the electromagnetic radiation with more than one rotational degree of freedom.

SUMMARY OF THE INVENTION

A new and improved micro-mirror system is disclosed. In one example, the system has at least three supporting springs attached to a micro-mirror providing at least two rotational degrees of freedom thereof. At least two enhancement springs are fanned out from the supporting spring to secure the micro-mirror, wherein the micro-mirror is electrostatically actuated to rotate while the supporting springs and the enhancement springs operate primarily in a tensile mode.

To manufacture the micro-mirror system as disclosed, a surface micro-machining process that is compatible with standard CMOS semiconductor fabrication process and equipment can be used. The present disclosure provides a stable mechanical system with full support against any independent tilting axes. In addition, there may be buried reinforcing dielectric material "sandwiched" between the mirror and spring layers to stiffen the mirror. Moreover, independently controlled driving electrodes help to produce multiple tilt directions.

DESCRIPTION OF THE PREFERRED EMBODIMENT

The present invention discloses a class of electro-statically actuated micro-machined mirror designs that are mechanically stable when actuated. Although the mirror designs can be used for various applications, the present invention is described in the context of using these mirror designs for use in fiber optical communication systems. Accordingly, various examples are shown below with regard to FIGS. 2–10. Although the present invention is described in the context of using the micro-mirror in a fiber-optic switch, it is understood that other applications for steering electromagnetic radiation are equally applicable.

Figure 1:
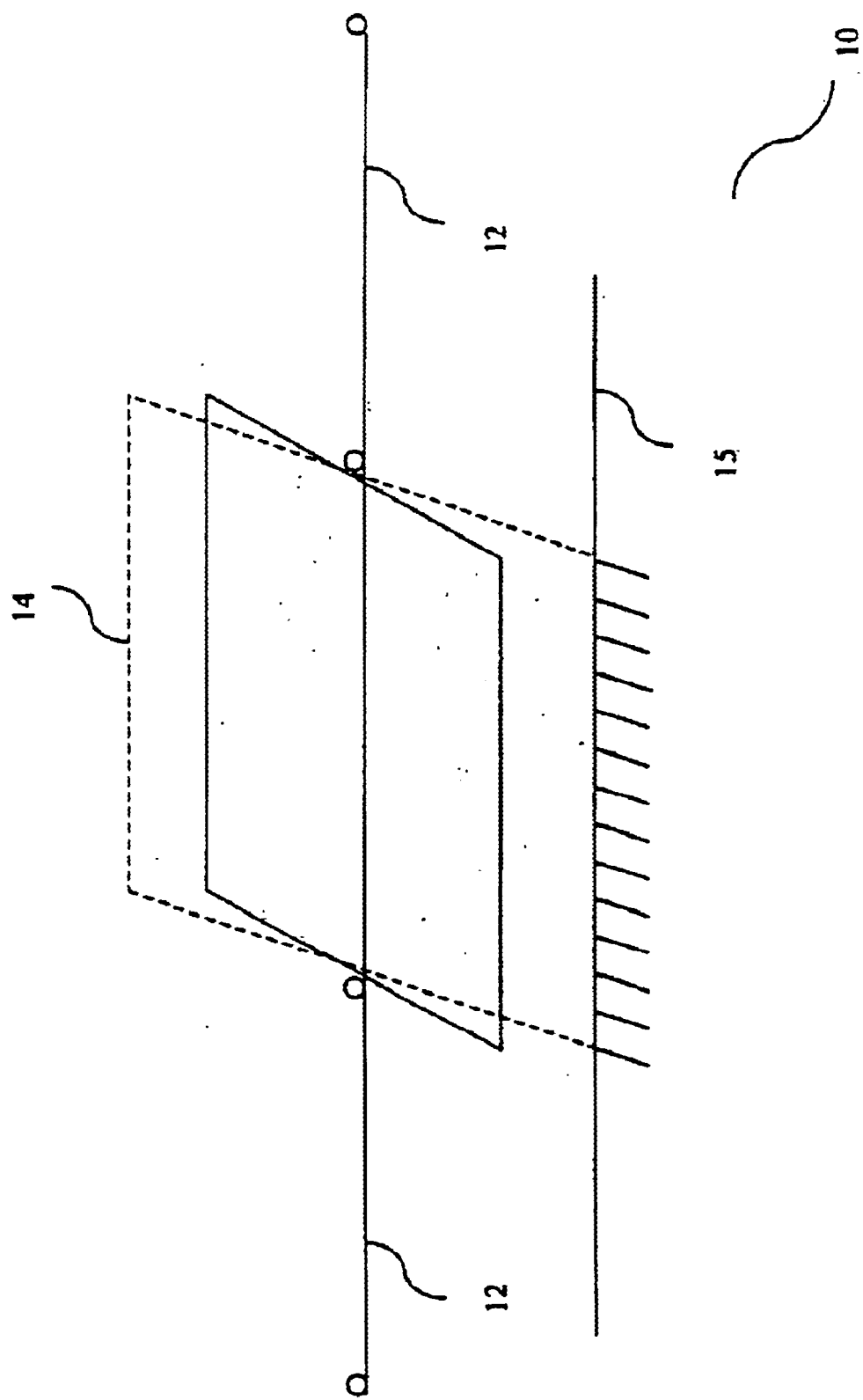
FIG. 1 illustrates a conventional method for securing and controlling a micro-mirror system.
Figure 2:
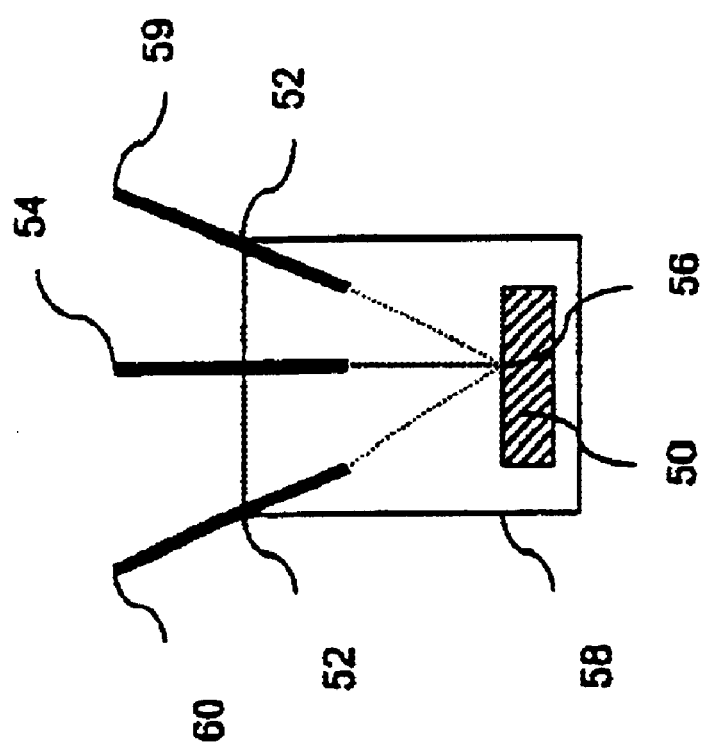

FIG. 2 illustrates a micro-mirror subsystem 50 in a fiber-optic switch which has a set of pre-defined, matching optical fiber slots 52, each slot containing one optical fiber 54 that carries either incoming or outgoing electromagnetic radiation. The radiation may contain either information carried by the optical communication system or data used for mirror control. For the purposes of describing the present invention, it is assumed that a light comes in through the optical fiber 54, reflects off a micro-mirror 56 located on the surface of the micro-mirror subsystem 50 which is contained inside a package 58, and outputs through another optical fiber 59 or 60. The micro-mirror 56 is too small to be visible in the drawing FIG. 2.

Figure 3:
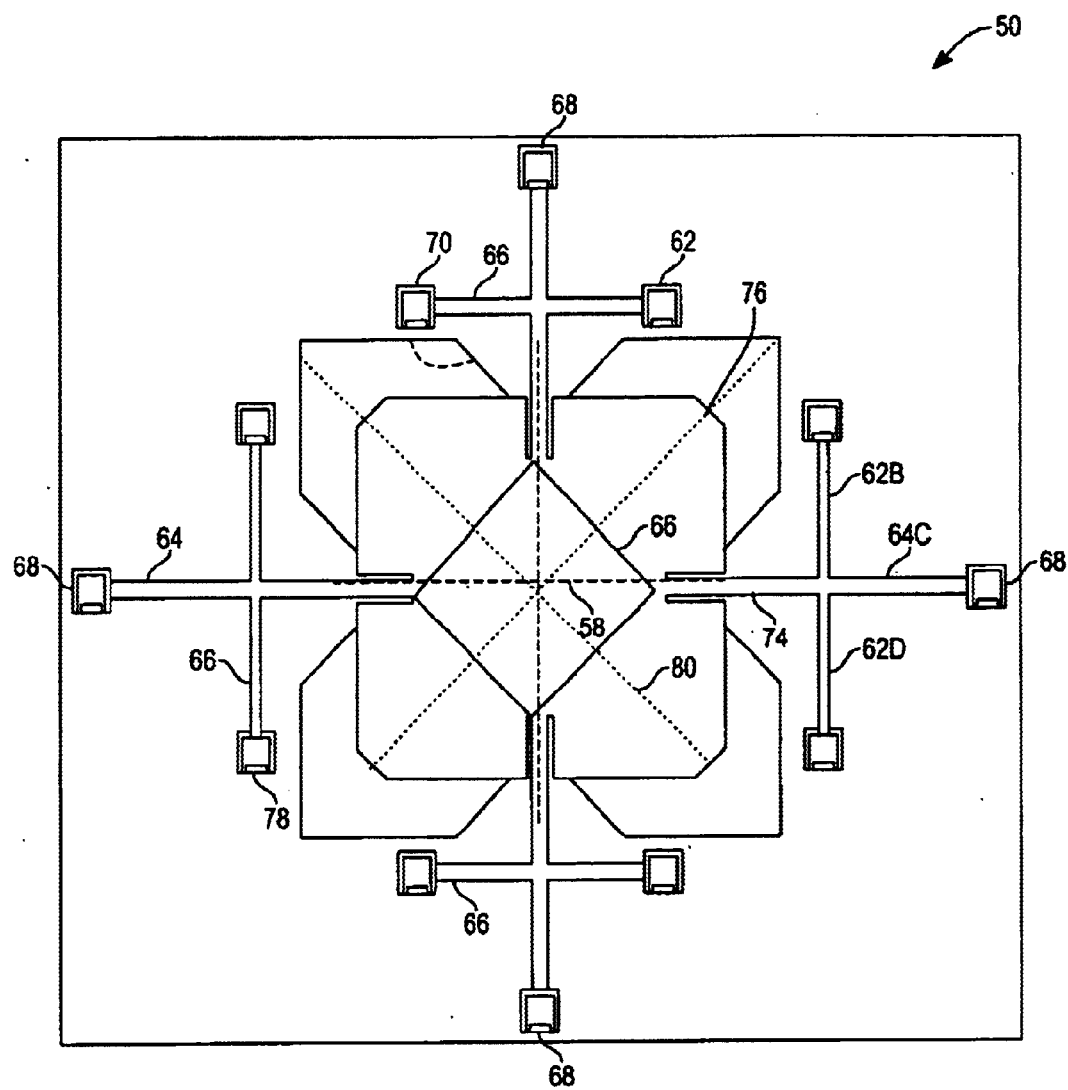
FIG. 3 illustrates a top view of the micro-mirror subsystem of FIG. 2 according to one example of the present invention.

FIG. 3 illustrates a top view of the micro-mirror subsystem 50 of FIG. 2 inside the package 58 according to one example of the present invention. The micro-mirror 56 is secured by four supporting spring assemblies such as 62 or 64. As it is shown, the mirror is recessed at predetermined locations to create "recessed joints" so that the supporting spring assemblies can reach deep toward the center of the mirror. By making these recessed joints to connect the spring assemblies, the range of movement of the mirror has been increased significantly. The vertices of the spring assemblies where the springs are in direct contact with the micro-mirror 56 (or the recessed joints) can conceptually form a polygon 66 by drawing lines connecting the vertices. The importance of this conceptual polygon 66 will be described later. Although the component springs of each supporting spring assembly may be formed together during semiconductor processing, each component can also be viewed as a separate spring, and in this case as shown in FIG. 3, each supporting spring assembly has four springs. For example, spring 62 has one component spring 62a connecting to the mirror 56 directly, and three other component springs 62b–62d are arranged in such a way that component spring 62c is a linear extension of the component spring 62a, and the component springs 62b and 62d are perpendicular to the component springs 62a and 62c. For the purposes of this invention, the component spring that is in direct contact with the mirror 56 is referred to as a supporting spring, while the other non-direct-contacting springs are referred to as enhancement springs. Connection points between the component springs 62b–d and other layers of semiconductor material are determined by the mechanical design such as a via 68 on the circuit. The micro-mirror 56 sits on a different layer than the layer where driving electrodes (70–76) are. The component springs are usually slender having a relatively high length-to-thickness ratio (e.g., 100 or higher) so that the spring assemblies are compliant in bending and torsion and thus can operate in a tensile mode while the driving electrodes are energized by certain acceptable voltages (e.g., under 100 volts). It is also noted that an individual component spring may have lower length-to-thickness ratio but the overall spring assembly is still compliant in bending and torsion due to other component springs and is thus consistent with the spirit of this invention.

Since the driving electrodes 70–76 are independently controlled, by asserting a predetermined voltage to a particular driving electrode, the micro-mirror 56 may tilt toward or away from that electrode due to a net electrostatic force. For example, as shown in FIG. 3, there are four electrodes underneath the micro-mirror 56, and the mirror can tilt toward any one of them, or to a pair of them, thereby rotating the mirror about either of the diagonal axes 80 and 81, or about axes 78 and 79. In a more advanced application, different voltage levels can be applied to each electrode to cause the mirror to tilt about any axis in the plane of axes 80 and 81, or in other words, with two rotational degrees of freedom. For the purposes of this invention, if the mirror can tilt about more than one axis, it is referred to as having more than one rotational degree of freedom. In addition, these degrees of freedom of movement are "elastic" such that the mirror will restore a neutral position once the electrostatic force is removed.

The enhancement springs 62b and 62d enhance the stability of the mirror by providing electro-static force components in directions perpendicular to the supporting spring 62a so that they prevent spurious motion of the mirror, such as twisting about an axis perpendicular to the mirror surface. The enhancement springs also reduce the overall stiffness of the spring assembly, thereby allowing an improved tilting range of the mirror and making the spring assembly easier to reach its tensile mode during operation.

Figure 4:
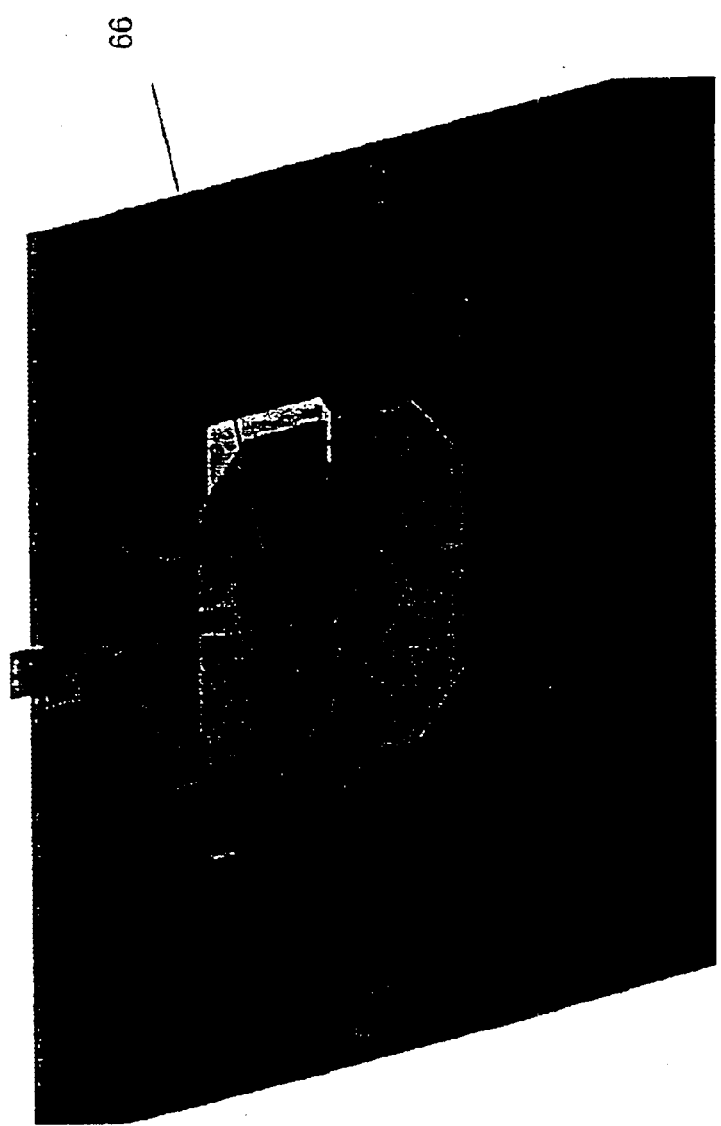
FIG. 4 illustrates a three dimensional view of the micro-mirror subsystem of FIG. 3 with each layer separately shown.

FIG. 4 is a three dimensional view of the micro-mirror subsystem 50 with each layer shown separately. It is noted that the attachment of each supporting spring to the micro-mirror may be recessed from the exterior edge of the mirror such that the same vertical spring deflection will allow a larger tilt angle of the mirror. It is also important that a net electrostatic force caused by all electrodes exerting on the mirror lies outside of the conceptual polygon 66, or as far away from the centroid of the polygon as possible. Only if this is achieved persistently when controlling the micro-mirror, can efficiency of the micro-mirror be obtained.

Figure 5:
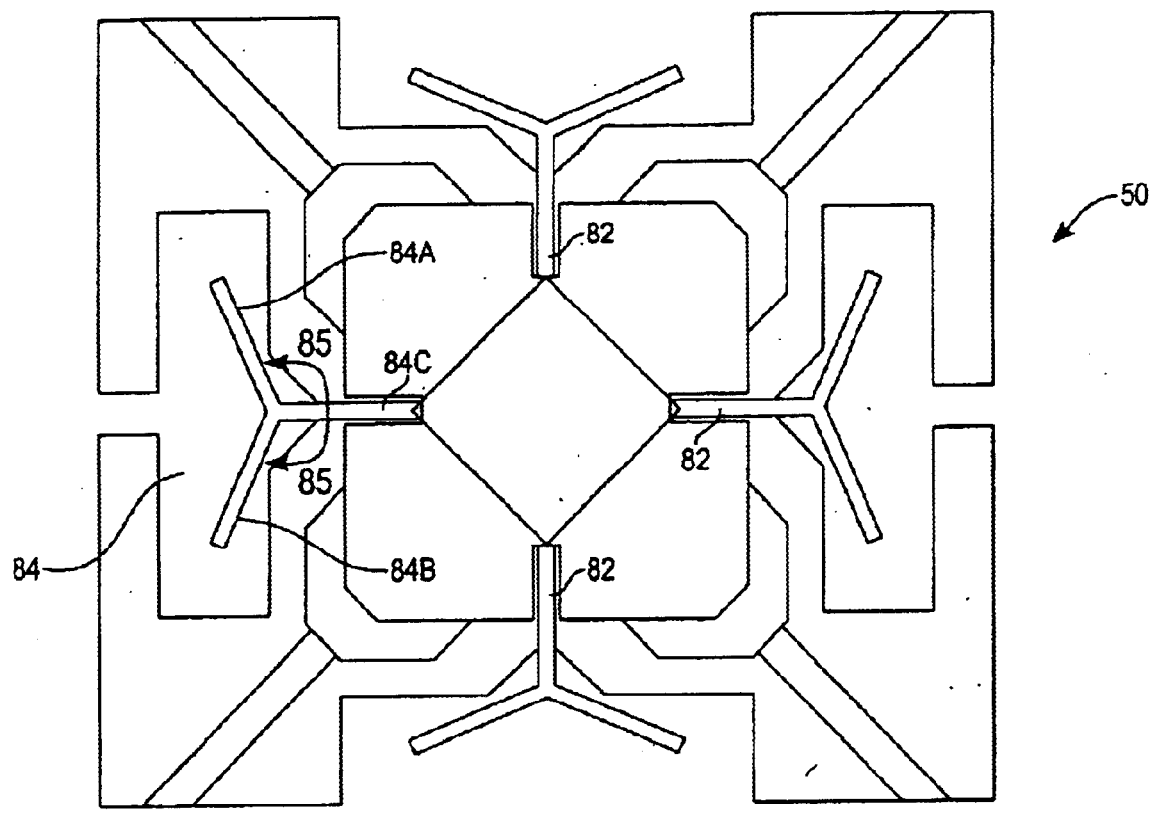
FIG. 5 illustrates a top view of the micro-mirror subsystem of FIG. 2 according to another example of the present invention.

FIG. 5 illustrates a top view of the micro-mirror subsystem 50 of FIG. 2 inside the package 58 according to another example of the present invention. In this example, the supporting spring assembly 82 has three component springs. Two enhancement springs 84a–b of the spring assembly 82 are electrically connected to a connection pad 84, while a supporting spring 84c is secured to the micro-mirror 56. In other words, each supporting spring that is attached to the edge of the mirror may "fan out" to multiple enhancement springs. The angle of the fan-out 85 (i.e., the angle between the supporting spring to the enhancement spring) may vary from 90 to 180 degrees, and preferably between 120 to 180 degrees. For example, the supporting spring and enhancement spring of FIG. 3 can be viewed as one supporting spring coming out from the mirror with three fan-outs, one with a 180 degrees, and the other two with 90 degrees. Similar to the arrangement in FIG. 3, this embodiment as illustrated in FIG. 5 provides the mirror with at least two degrees of freedom of movement.

Figure 6:
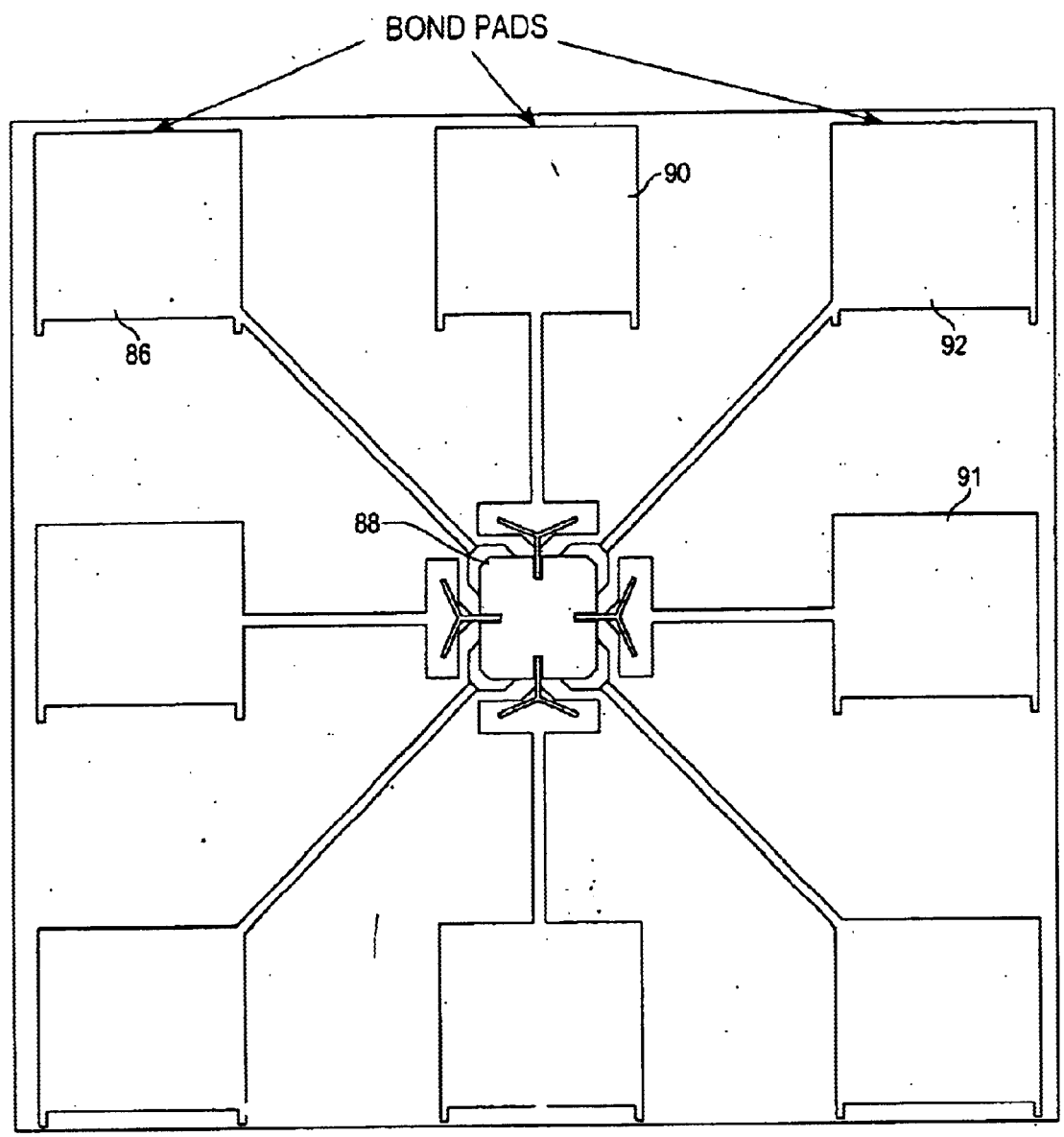
FIG. 6 illustrates a zoom-out view of the micro-mirror subsystem showing multiple bond pads along the borders of the subsystem.

FIG. 6 illustrates a zoom-out view of the micro-mirror subsystem 50 showing multiple bond pads along the borders of the subsystem. For example, the bond pad 86 connects to a driving electrode 88, the bond pad 90 connects to a neutral electrode (not shown) underneath the micro-mirror, and the bond pad 92 also connects to another driving electrode 91. Therefore, the voltage level of each driving electrode can be independently controlled by asserting appropriate voltage on the corresponding bond pad along the borders of the micro-mirror subsystem to actuate the movement of the mirror.

Figure 7:
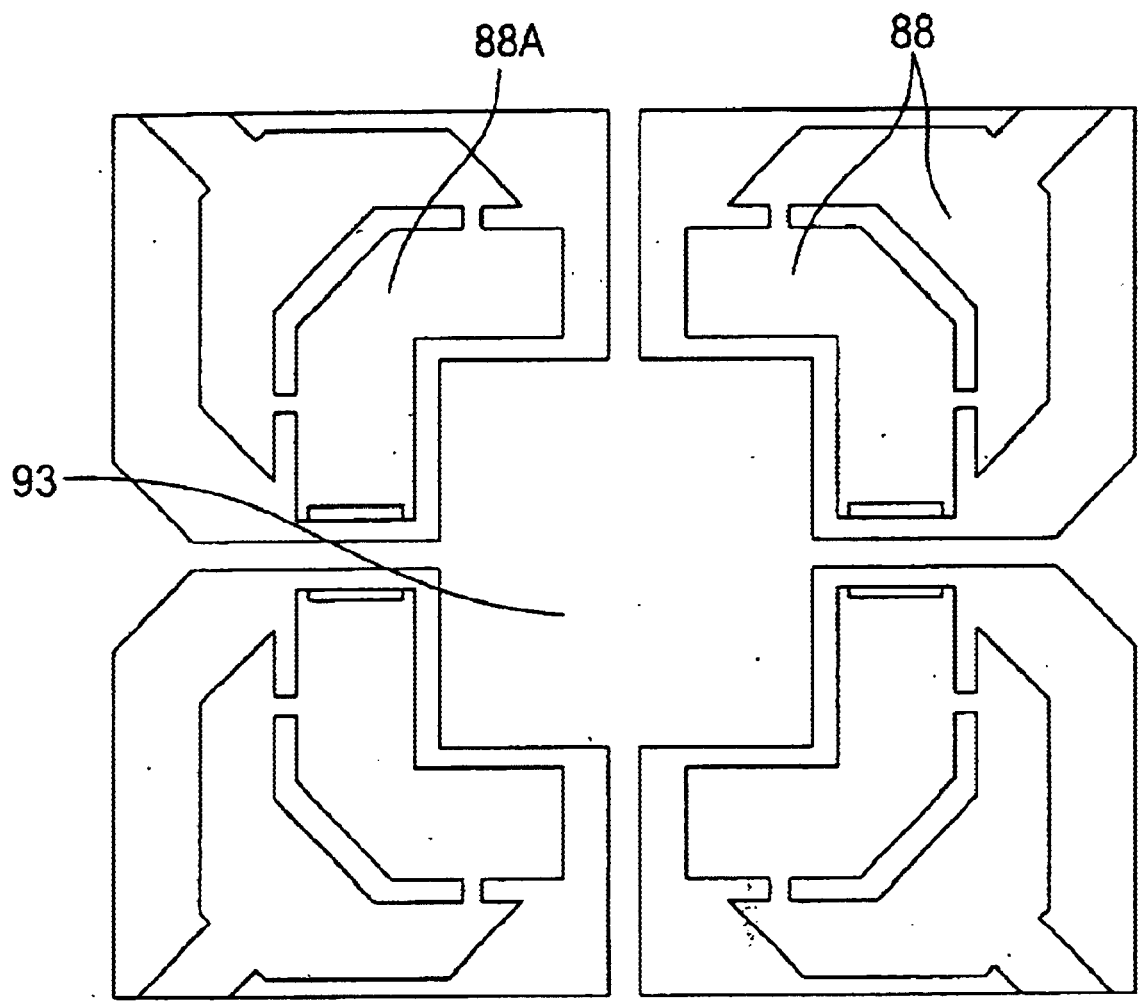
FIG. 7 illustrates a zoom-in view of the micro-mirror with regard to multiple driving electrodes underneath the mirror.
Figure 8:
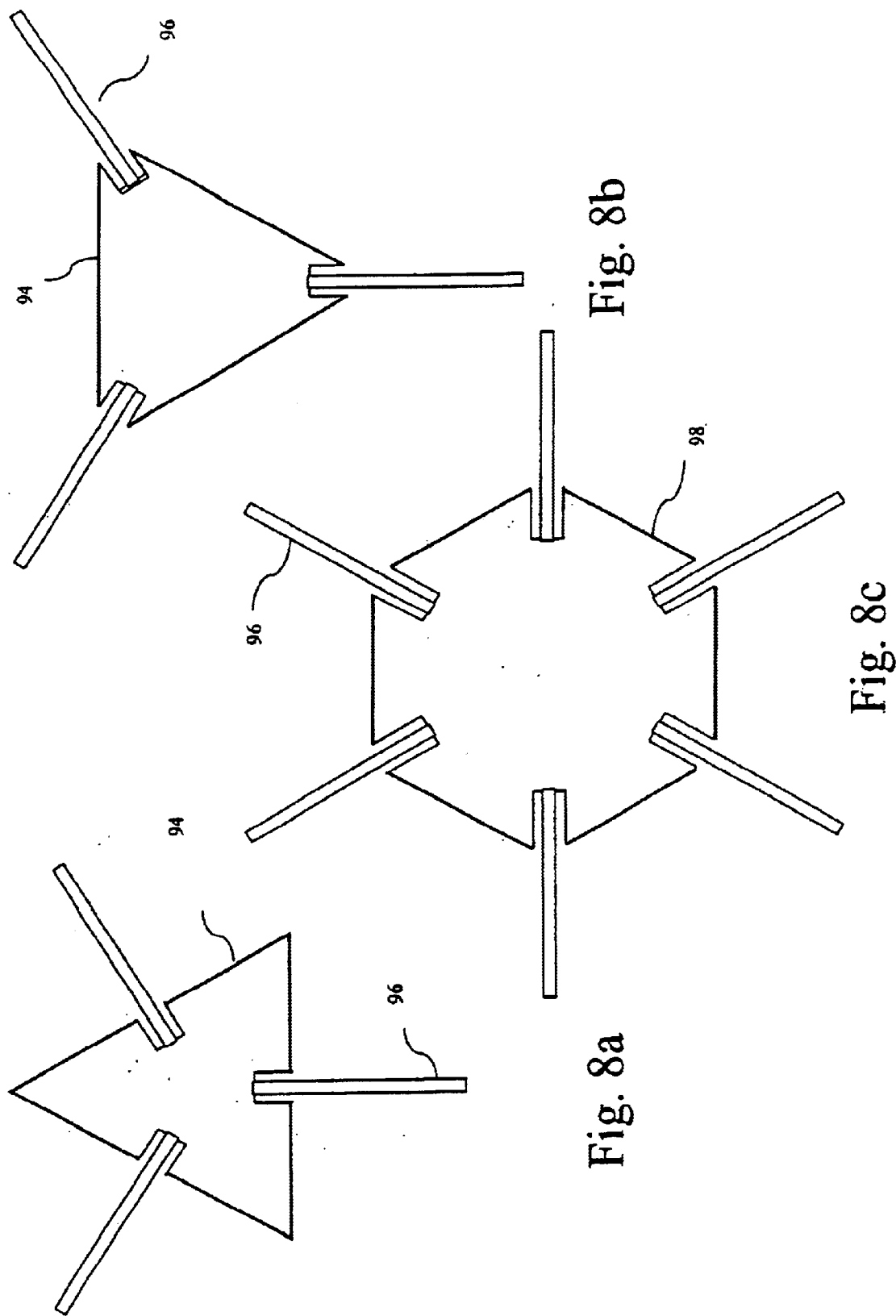
FIGS. 8a, 8b and 8c illustrate a micro-mirror of other geometrical shapes and their corresponding mechanisms for securing supporting springs thereto.
Figure 9:
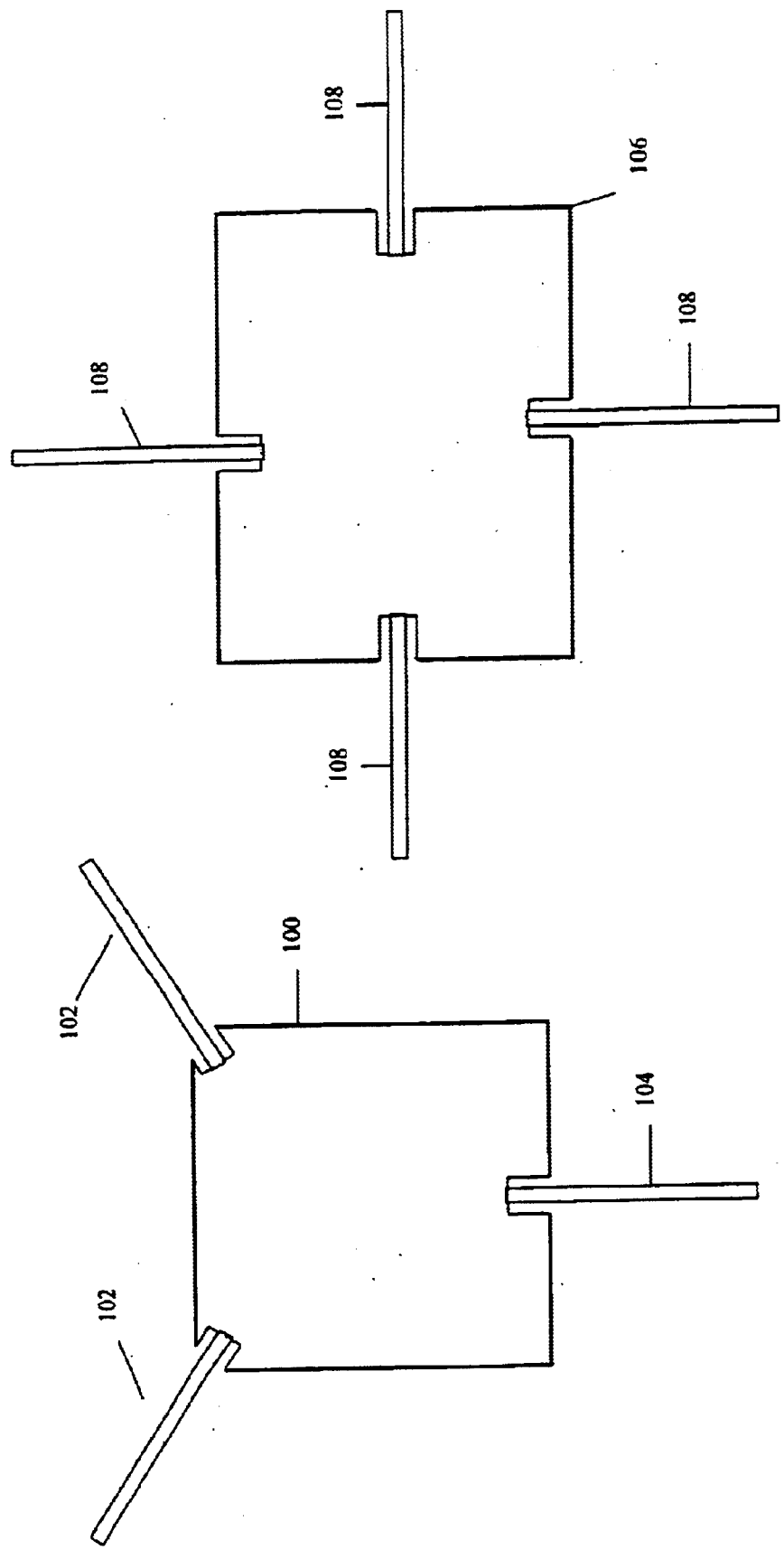
FIGS. 9a and 9b illustrate other arrangements of the supporting springs according to the present invention.

FIG. 7 illustrates a zoom-in view of the micro-mirror subsystem with regard to the multiple electrodes underneath the mirror. It is understood that the area of any driving electrode 88 that is close to the mirror determines how large an influence this Hi particular driving electrodes can exert. By carefully designing such areas 88a of the driving electrode, the micro-mirror subsystem will function in an optimal manner. A neutral electrode 93 is introduced by the present invention to be situated directly a underneath the mirror. The neutral electrode 93 is formed on the same semiconductor layer with the driving electrodes, and "etches off" a portion of the corners of the driving electrodes. One function of having the neutral electrode is that, in semiconductor processing, it helps to planarize the mirror on top of it. The better flatness of the mirror is due to a more uniform topography on which the mirror is deposited, which in turn improves the quality and function of the mirror.

The driving electrodes are switched between an on-potential and an off-potential (e.g., the mirror potential) whereas the neutral electrode 93 is kept at the same potential level as the mirror. The on-potential is provided by a programmable power supply. The combination of independently controlled driving electrode potentials produces a substantially vertical net electro-static force that causes the desired mirror tilting movement. Because of the existence of the neutral electrode 93, the electrostatic forces act primarily on the outer portion of the mirror, thereby further assuring that the net electrostatic force vector acts on the mirror outside the conceptual polygon 66 (FIGS. 3–5). The driving electrodes may be covered with a dielectric thin film (such as silicon dioxide or silicon nitride) to prevent catastrophic failure due to shorting, or to enhance the electric field and the attraction force to the mirror.

FIGS. 8a, 8b and 8c illustrate a micro-mirror of other geometrical shapes and their corresponding mechanisms for securing supporting springs thereto. For example, in FIG. 8a, the micro-mirror 94 is of a triangular shape, and the supporting springs are attached to each side of the triangular mirror. In FIG. 8b, the supporting springs 96 are attached to the vertices of the triangular mirror. FIG. 8c illustrates another geometrical shape of the micro-mirror 98, which is a hexagon with supporting springs connected to the vertices thereof.

FIGS. 9a and 9b purposefully demonstrate that the arrangement of the supporting springs does not need to possess a rigid symmetry as those shown in FIGS. 2–8c. In FIG. 9a, the micro-mirror 100 is a square one and two of the supporting springs are attached to two corners of the mirror, while the other 104 is in the middle of a side. In FIG. 9b, the mirror 106 is of a rectangular shape, and none of the four supporting springs 108 faces directly to another to form a continuous linear axis. They are shifted away from the center line of the rectangular mirror. Although these FIGS. indicate that the mirror can be of various shapes and the supporting springs can be arranged asymmetrically, it is understood that the key requirements are to secure the mirror so that it is stable under electrostatic actuation and has at least two rotational degrees of freedom of movement. The stability prevents surface-to-surface contact which in turn prevents stiction from developing.

Figure 10:
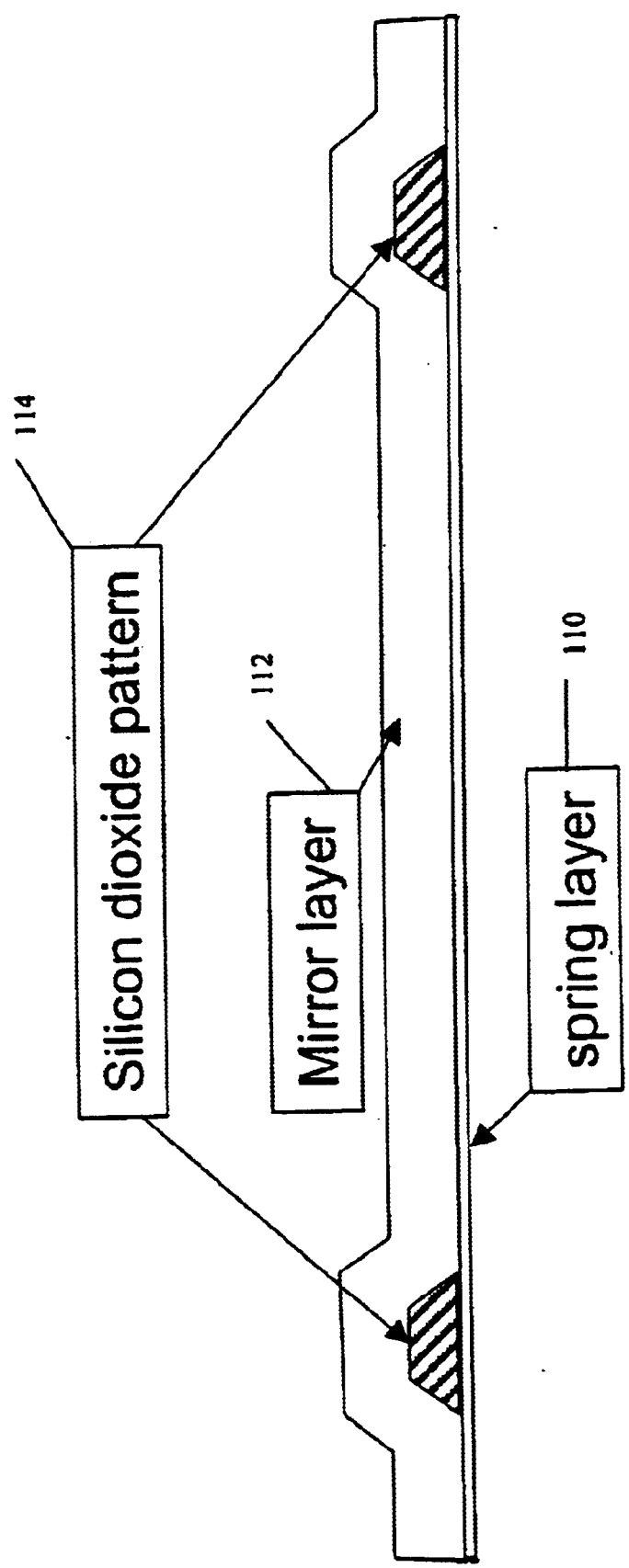
FIG. 10 illustrates a sectional view of a micro-mirror with re-enforcing oxide layer according to one example of the present invention.

FIG. 10 illustrates a sectional view of a micro-mirror according to one example of the present invention. The sectional view shows that the spring layer 110 sits at the bottom on top of which is the mirror layer 112. The present invention includes an optional frame of buried silicon dioxide pattern to stiffen the mirror and prevent the mirror from curling up or down. This frame of silicon dioxide may include a number of discontinuous segments. The structure shown can be fabricated using conventional semiconductor processing equipment sets such as those used for SRAM or micro-processors.

Figure 11:
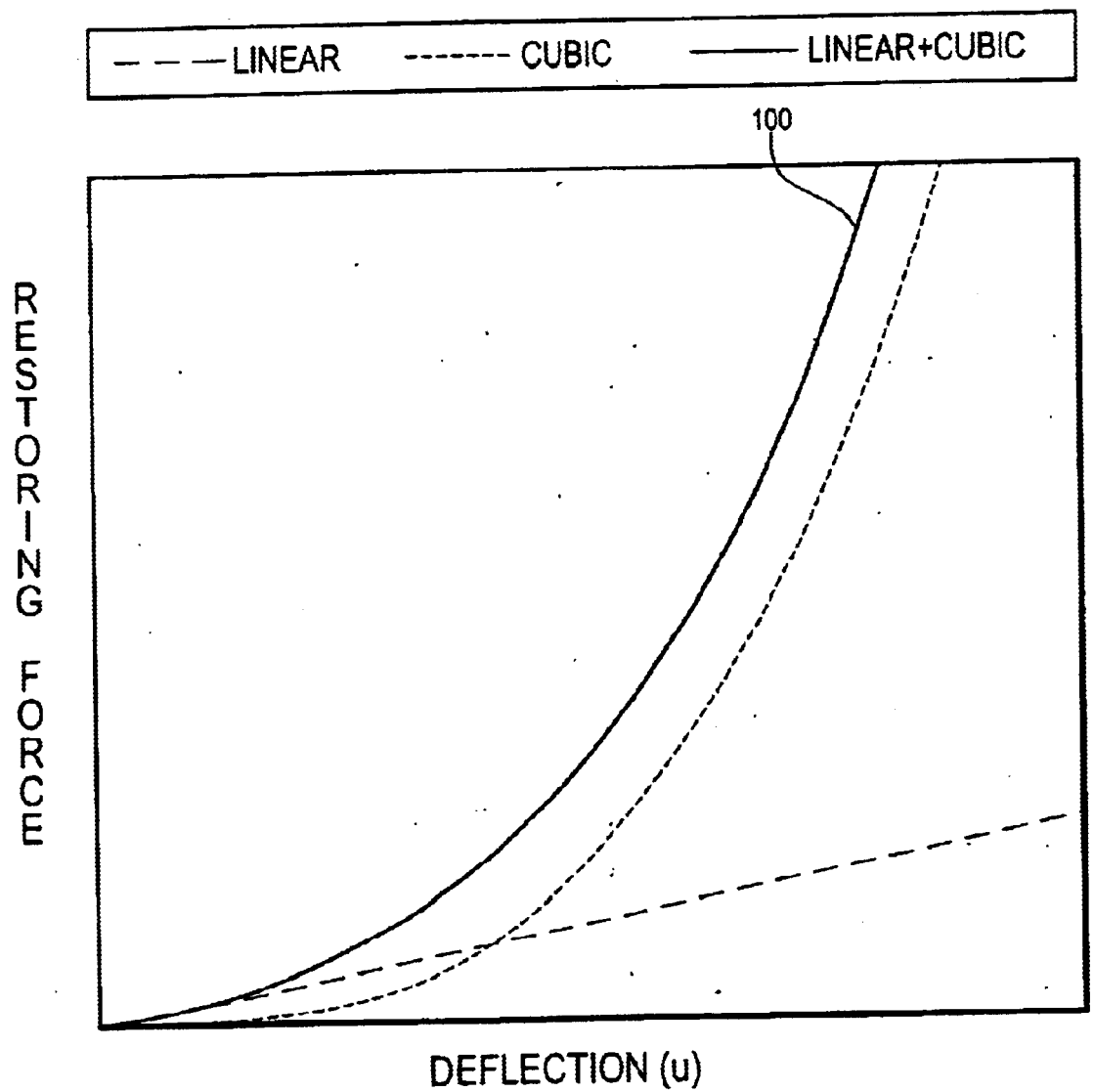
FIG. 11 illustrates a relationship between a net restoring force of the supporting springs along with enhancement springs and a deflection thereof.

FIG. 11 is a graphical presentation of the relation between the restoring force generated by the spring assemblies of the mirror and the deflection thereof. A curve shows that the restoring force F increases dramatically while the deflection parameter u of the mirror grows. The mathematical relationship can be approximated as $F = a \cdot u + b \cdot u^2 + c \cdot u^3$, where a, b and c are selected parameters, independent of the deflection u, and the parameter b is ordinarily small or 0 in an ordinary environment.

The present invention as described above thus provides an improved method for securing and controlling an optical micro-mirror. Various benefits are achieved over conventional approaches. For example, the arrangement of the supporting springs of the present invention as described above provides a superior mechanical stability because the stiffness of the springs increases with deflection and the two independent tilting directions are fully supported and constrained. More particularly, since the spring assemblies in the present invention primarily operate in a tensile mode after the mirror has deflected to a certain extent as opposed to the conventional bending or torsion mode, the restoring force increases dramatically and asymptotically approaches the cube of a deflection parameter "u" mathematically. The deflection parameter "u", in turn represents the tilting movement of the mirror. Therefore, as the mirror tilt increases, the restoring force increases rapidly to enhance the mirror stability, which makes the mirror less likely to touch any other layers, and thereby reduces the propensity of causing stiction.

Since the micro-mirror of the present invention enjoys at least two rotational degrees of freedom of movement with a reproducible off-position, fewer mirrors are needed for an optical switch. For instance, in the case of 1×N application wherein one input light source needs to be reflected to N different ways to generate N output light beams, only one mirror is needed. With this capability, one design of the micro-mirror will satisfy different switching requirements, thereby shortening switch sub-system product development cycle and cost.

In addition, while describing the supporting spring assembly, each component spring such as the supporting spring or the enhancement spring is described as if it is an independent spring, it is equally understandable to one skilled in the art that these components are parts of a contiguous spring assembly formed by one formation process. They can be easily viewed as only a branch or a "leg" of the entire spring assembly.

The above disclosure provides many different embodiments, or examples, for implementing different features of the invention. Specific examples of components, and processes are described to help clarify the invention. These are, of course, merely examples and are not intended to limit the invention from that described in the claims. For example, various geometric constructions of the mirror and springs and various arrangements of the electrodes and spring assemblies can be conceivably used in conjunction with various examples of the present invention.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for securing and controlling a micro-mirror, the method comprising:

directly connecting three or more supporting springs to a micro-mirror at selected spaced apart locations to provide a restoring force for each of at least two rotational degrees of freedom of movement of the micro-mirror, where the spring connection locations form a conceptual polygon and the supporting springs maintain a length-to-thickness ratio selected so that the supporting springs operate primarily in a tensile mode;

electro-statically actuating the micro-mirror by three or more spaced apart driving electrodes located adjacent to the micro-mirror, with each driving electrode being independently controlled; and providing the micro-mirror with a frame including dielectric material positioned close to at least one edge of the micro-mirror and positioned between a first material layer that contains the micro-mirror and a second material layer that contains the supporting springs.

2. The method of claim 1, further comprising providing a voltage of less than 100 volts between said micro-mirror and said electrodes.

3. The method of claim 1, further comprising associating at least two enhancement springs with at least one of said supporting springs to enhance stability and to provide a selected tilting range for said micro-mirror.

4. The method of claim 3, further comprising orienting at least one of said enhancement springs perpendicular to said associated supporting spring.

5. The method of claim 3, further comprising fanning out at least one of said enhancement springs from said associated supporting spring with a selected angle to said associated supporting spring.

6. The method of claim 5, further comprising selecting said angle between said supporting spring and at least one of said associated enhancement springs to be between 90 degrees and 180 degrees.

7. The method of claim 3, further comprising configuring at least one of said supporting springs and said associated enhancement springs so that said restoring force between said at least one supporting spring and said micro-mirror increases with a measure u of spring deflection approximately as $a \cdot u + b \cdot u^2 + c \cdot u^3$, where a, b and c are selected non-zero numbers.

8. The method of claim 3, further comprising configuring at least one of said supporting springs and said associated enhancement springs so that said restoring force between said at least one supporting spring and said micro-mirror increases with a measure u of spring deflection approximately as $a \cdot u + c \cdot u^3$, where a and c are selected parameters non-zero numbers. supporting springs.

9. The method of claim 1, further comprising providing said dielectric material as a discontinuous buried layer.

10. The method of claim 1, further comprising positioning said supporting springs and recessing said micro-mirror so that a net electro-static force generated by said driving electrodes is directed outside of said conceptual polygon when said micro-mirror is in operation.

11. The method of claim 1, further comprising recessing said micro-mirror in at least one selected location to connect said supporting springs thereto to provide a selected tilting range for said micro-mirror.

12. A method for securing and controlling a micro-mirror, the method comprising:

directly connecting three or more supporting springs to a micro-mirror at selected spaced apart locations to provide a restoring force for each of at least two rotational degrees of freedom of movement of the micro-mirror, where the spring connection locations form a conceptual polygon and the supporting springs maintain a length-to-thickness ratio selected so that the supporting springs operate primarily in a tensile mode;

electro-statically actuating the micro-mirror by three or more spaced apart driving electrodes located adjacent to the micro-mirror, with each driving electrode being independently controlled, and providing one or more neutral electrodes positioned adjacent to the micro-mirror, where the neutral electrodes and the adjacent micro-mirror have substantially the same electrical potential.

13. The method of claim 12, further comprising locating at least one of said neutral electrodes substantially at the center of said micro-mirror.

14. The method of claim 12, further comprising providing a voltage of less than 100 volts between said micro-mirror and said electrodes.

15. The method of claim 12, further comprising associating at least two enhancement springs with at least one of said supporting springs to enhance stability and to provide a selected tilting range for said micro-mirror.

16. The method of claim 15, further comprising orienting at least one of said enhancement springs perpendicular to said associated supporting spring.

17. The method of claim 15, further comprising fanning out at least one of said enhancement springs from said associated supporting spring with a selected angle to said associated supporting spring.

18. The method of claim 17, further comprising selecting said angle between said supporting spring and at least one of said associated enhancement springs to be between 90 degrees and 180 degrees.

19. The method of claim 15, further comprising configuring at least one of said supporting springs and said associated enhancement springs so that said restoring force between said at least one supporting spring and said micro-mirror increases with a measure u of spring deflection approximately as $a \cdot u + b \cdot u^2 + c \cdot u^3$, where a, b and c are selected parameters.

20. The method of claim 15, further comprising configuring at least one of said supporting springs and said associated enhancement springs so that said restoring force between said at least one supporting spring and said micro-mirror increases with a measure u of spring deflection approximately as $a \cdot u + c \cdot u^3$, where a and c are selected parameters.

* * * * *